United States Patent

Hanique et al.

Patent Number: 5,785,164
Date of Patent: Jul. 28, 1998

[54] DECLUTCHING DEVICE FOR A CLUTCH, ESPECIALLY FOR MOTOR VEHICLES

[75] Inventors: Laurent Hanique, Taisnil; Jean-Michel Kromwel; Eric Marie, both of Amiens, all of France

[73] Assignee: Valeo, Paris, France

[21] Appl. No.: 722,638

[22] Filed: Sep. 27, 1996

[30] Foreign Application Priority Data

Oct. 9, 1995 [FR] France ..................... 95 11847

[51] Int. Cl.⁶ ............................................. F16D 23/14
[52] U.S. Cl. ............................... 192/99 S; 192/98
[58] Field of Search ......................... 192/99 S, 98, 192/89.23

[56] References Cited

U.S. PATENT DOCUMENTS

| | | | |
|---|---|---|---|
| 3,983,983 | 10/1976 | Steiskal et al. | 192/99 S |
| 4,655,335 | 4/1987 | Maruyamano et al. | 192/99 S |
| 5,156,248 | 10/1992 | Caron | 192/98 |

FOREIGN PATENT DOCUMENTS

| | | |
|---|---|---|
| 0474546 | 3/1992 | European Pat. Off. . |
| 2250455 | 4/1974 | Germany . |
| 4025213 | 2/1992 | Germany . |

*Primary Examiner*—Rodney H. Bonck
*Assistant Examiner*—Saúl J. Rodríquez
*Attorney, Agent, or Firm*—Longacre & White

[57] ABSTRACT

A clutch release device comprises a clutch release bearing which slides axially along a tubular guide member fixed to a fixed structure and defining an axis, and a declutching fork pivoted on the fixed structure about pivot arrangement which define at least one pivot point spaced away from the axis. The fork acts on the clutch release bearing through a thrust zone of a manoeuvring element of the latter, so as to displace the release bearing axially along the guide member. The declutching fork acts on the thrust zone in a line of contact which intersects the axis regardless of the angular position of the declutching fork.

7 Claims, 2 Drawing Sheets

DECLUTCHING DEVICE FOR A CLUTCH, ESPECIALLY FOR MOTOR VEHICLES

FIELD OF THE INVENTION

The present invention relates to declutching devices for clutches, especially motor vehicle clutches, where the declutching device is of the kind comprising a clutch release bearing arranged for sliding movement along a tubular guide member, together with a declutching fork which is mounted for pivoting movement on a fixed part of the vehicle, the fork being arranged to act on the clutch release bearing so as to displace the latter axially along the said guide member.

BACKGROUND OF THE INVENTION

A conventional clutch for a motor vehicle is shown in FIG. 1 of the accompanying drawings, which shows a clutch of a typical known design, together with its associated clutch release bearing and declutching fork constituting a declutching device of the kind described above.

This prior art clutch comprises a reaction plate 21 which is fixed to a driving shaft 20 for rotation with the latter, together with a clutch friction wheel 22 which is fixed in rotation to a driven shaft 30. The driving shaft 20 is typically the crankshaft of an internal combustion engine for a motor vehicle, while the driven shaft 30 is typically the input shaft of the gearbox. The clutch further includes a pressure plate 23, a diaphragm 24, and a cover plate 25, together with a declutching device comprising a clutch release bearing 1 and a declutching fork 3.

The diaphragm 24, which constitutes an axially acting spring, bears on a primary abutment 26 of the cover plate 25 so as to act on the pressure plate 23 (or more precisely on a projecting ridge of the latter), in order to grip friction liners 122, carried by the clutch friction wheel 22 at its outer periphery, between the pressure plate 23 and the reaction plate 21. This clutch is accordingly of the normally engaged type, and the engine torque is transmitted to the input shaft 30 of the gearbox via the friction liners 122, which are coupled, elastically in this example, to a hub 123 which is splined internally. The hub 123 is carried in the center of the clutch friction wheel 22, so that the latter is coupled to the gearbox input shaft 30 via the splined hub 123.

The cover plate 25 is in the form of a hollow dish, and has a central hole. It is secured by screw fastening on the reaction plate 21 by means of its radial flange. The pressure plate 23 is coupled in rotation to the cover plate 25, but is capable of axial movement with respect to the latter, to which it is coupled for this purpose by means of resilient tongues 29. The tongues 29 are oriented tangentially, and are fixed by riveting to the pressure plate 23 at one of their ends, and by riveting to a portion of the flange of the cover plate 25 at their other end.

In order to disengage the clutch, the clutch release bearing 1 is applied on the inner end of the fingers of the diaphragm 24, so as to cause the diaphragm to pivot between its primary abutment 26 and a secondary abutment 27 which lies facing the primary abutment 26. In this example, the clutch is of the push-to-release type, so that the force exerted by the clutch release bearing is a thrust on the diaphragm.

In this case the secondary abutment 27 is part of a crown having a V-shaped cross section, which is carried by lugs 28 projecting intergrally from the cover plate 25 and formed by press-forming and bending. The pivoting action of the diaphragm 24 cancels out the force which is applied by the diaphragm 24 on the pressure plate 23, so that the pressure plate 23 is moved axially towards the base of the cover plate 25 under the return force exerted by the resilient tongues 29, so releasing the friction liners 122. The engine torque is then no longer transmitted by the clutch to the input shaft 30 of the gearbox.

More precisely, the clutch release bearing 1 has an actuating element 4 which is adapted to act on the inner ends of the fingers of the diaphragm 24, together with a manoeuvring element 10. The declutching fork 3 is mounted pivotally, in this example on a ball mounting 5 which defines a pivot fulcrum point 7, on the fixed casing 40 of the gearbox. The fork 3 is adapted to act on the manoeuvring element 10 of the clutch release bearing. This element 10 comprises a sleeve 14, a radial plate 12, and a thrust plate or thrust ring 113 defining a thrust zone 13.

In this example the actuating element 4 constitutes an extension of the inner ring of a ball bearing 11, the outer ring of which is non-rotating. The outer ring of the bearing 11 is attached axially to the radial plate 12 through a resilient shroud 15. The radial plate 12 is fixed to the sleeve 14, which is mounted for sliding movement along a tubular guide member 2 defining an axis 6. The guide member 2 is fixed to the fixed casing 40 of the gearbox.

The manoeuvring element 10 is thus mounted for sliding movement, through its sleeve 14, on the guide member 2 under the action of the declutching fork 3. In this connection, one end of the fork 3 has fingers 33, by means of which it acts on the thrust zone 13 of the clutch release bearing. The other end 32 of the declutching fork 3 is itself acted on by a push rod 31, which is manoeuvred from the clutch pedal of the vehicle (not shown). In the example shown in FIG. 1, the thrust zone 13 consists of the transverse face of the thrust ring 113, which is paired with the radial plate 12 and on which the fingers 33 of the declutching fork (which are bowed) bear locally. In another known version, not shown, the fingers 33 of the fork 3 act directly on a transverse face of the radial plate 12: the thrust zone thus enables a thrust to be exerted on the radial plate 12 either directly or indirectly.

In its middle part, the declutching fork 3 has a spherical socket 35 for cooperation with the ball mounting 5. In another version, the declutching fork may be mounted on the gearbox casing 40 for pivoting movement about an axis, or again it may be mounted by means of knife-edge tilting supports. In all cases, means for enabling the declutching fork 3 to pivot on the fixed part of the vehicle are provided.

The declutching fork 3 thus performs a rotary movement over an arc of a circle, while the clutch release bearing 1 moves in a straight line along the axis 6. This causes the fork 3 to be displaced transversely with respect to the radial plate 12 and thrust ring 113. The fingers 33 slide in contact with the latter. This gives rise to both noise and wear. In addition, it leads to risks of jamming between the sleeve 14 and the guide member 2 with which it is in contact.

DISCUSSION OF THE INVENTION

An object of the present invention is to overcome the above mentioned drawbacks.

According to the invention, a declutching device for a clutch, especially for a motor vehicle, of the kind comprising a clutch release bearing adapted for axial sliding movement along a guide member which is fixed to a fixed part, the guide member being tubular and defining an axis, the declutching device further including a declutching fork which is mounted pivotally on the said fixed part about pivoting means which define at least one pivot point located at a distance from the said axis, the declutching fork being adapted to act on the clutch release bearing through a thrust zone of a manoeuvring element of the clutch release bearing, so as to displace the latter axially along the guide member, is characterised in that the declutching fork acts on the said thrust zone in a line of contact which intersects the said axis regardless of the angular position of the declutching fork.

The profiled declutching fork slides in contact with the said thrust zone; and since the line of contact intersects the axis of the guide element, the fork exerts on the clutch release bearing no force such as to cause any tilting, and therefore such as to detract from the declutching movement. This arrangement is inexpensive, and does not call for recourse to be had to a control shoe as disclosed in European patent specification No. 0 474 576A, nor to an articulated member as in German patent specification No. DE 40 25 213A.

Preferably, the declutching fork has two arms at one of its ends through which it cooperates with the thrust zone of the manoeuvring element, with each of these arms having a free end configured as a bowed finger, and with the two said arms extending parallel to the plane of symmetry of the declutching fork.

The bowed fingers of the said arms preferably have a generally U-shaped cross section through a plane at right angles to the plane of symmetry of the declutching fork.

According to a preferred feature of the invention, the outer surfaces of the bowed fingers, by means of which the declutching fork cooperates with the thrust zone of the manoeuvring element, are convex and cylindrical, having generatrices at right angles to the plane of symmetry of the declutching fork. The directrix defining the said outer surfaces of the bowed fingers is preferably a portion of a curve such that, at the point of intersection of the said curve with the said axis, when it is turned in the plane of symmetry of the declutching fork about the pivot point of the latter, the tangent to the said curve is in the plane which lies at right angles to the said axis at that point.

In one embodiment of the invention, the said directrix is defined by the following coordinates in Cartesian notation, in which the origin is the said pivot point, the x-axis extending along the axis of the guide member, and the y-axis extending at right angles to the x-axis and being in the transverse plane defined by the pivot point and the axis of the guide member:

| x | 57.15 | 55.23 | 53.64 | 52.40 | 51.53 | 51.05 | 50.99 |
|---|-------|-------|-------|-------|-------|-------|-------|
| y | 0.88  | 1.61  | 2.07  | 2.31  | 2.40  | 2.41  | 2.40  |

Further features and advantages of the invention will appear, and a better understanding of the invention will be obtained, from a reading of the following detailed description of an embodiment of the invention, given by way of purely illustrative and non-limiting example only and with reference to the accompanying drawings.

DESCRIPTION OF A PREFERRED EMBODIMENT OF THE INVENTION

Figure 1:
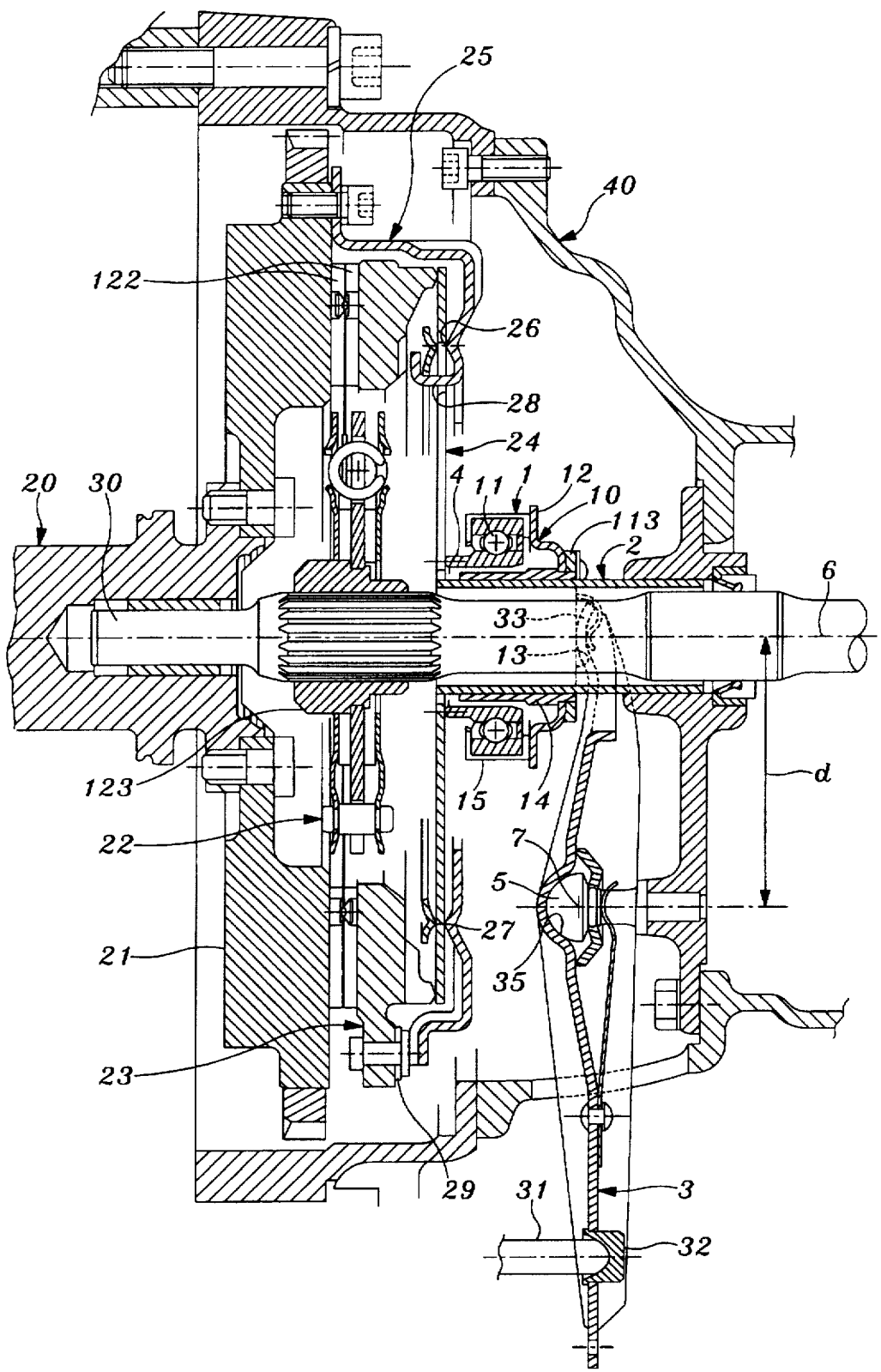
FIG. 1, as already mentioned, shows a clutch, with its associated clutch release bearing and declutching fork in a typical example of the prior art.
Figure 2:
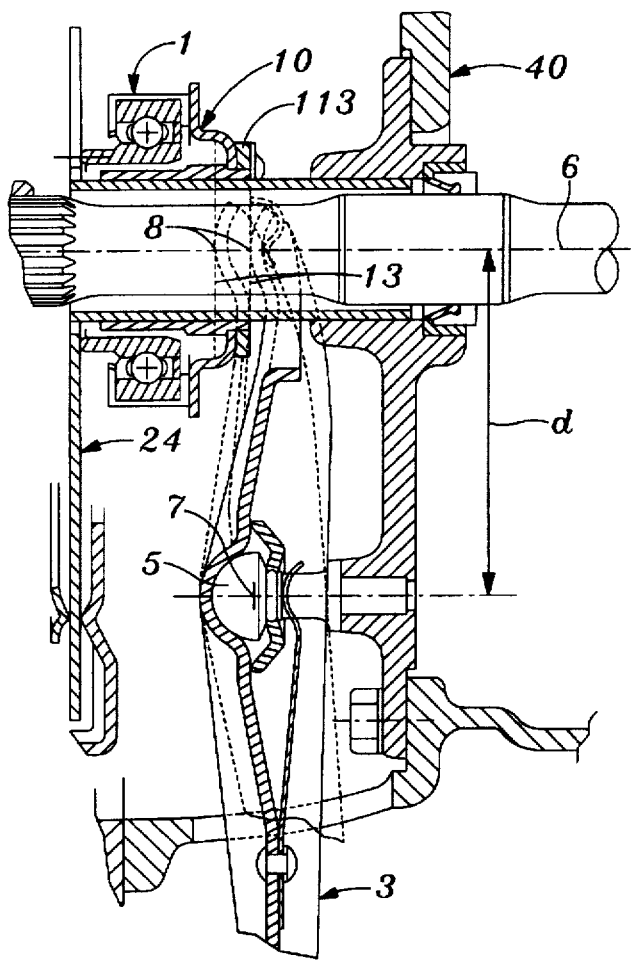
FIG. 2 repeats part of FIG. 1, but with the declutching device being here a device in accordance with the present invention.
Figure 3:
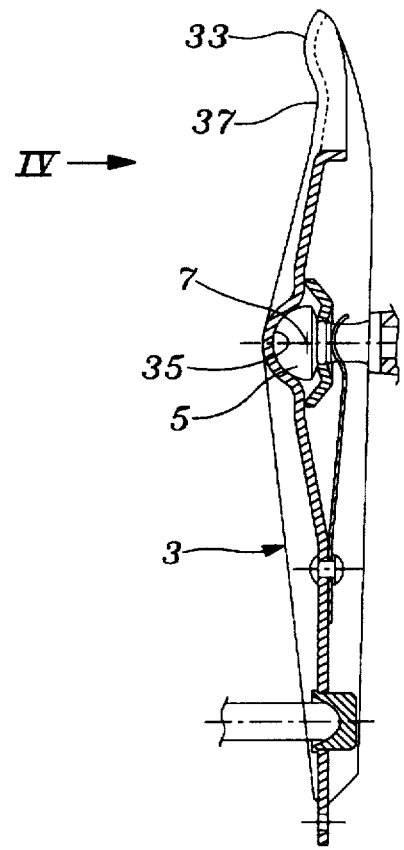
FIG. 3 is a partial view of the declutching fork by itself, shown in cross section taken on the line III—III in FIG. 4.
Figure 4:
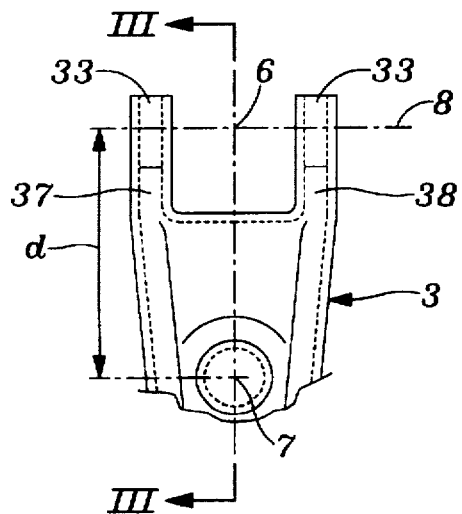
FIG. 4 is a scrap view in the direction of the arrow IV in FIG. 3.

Reference is here made to FIGS. 2 to 4, in which it can be seen that the declutching fork 3 has, at the end through which it cooperates with the thrust zone 13 of the manoeuvring element 10, two arms 37 and 38 respectively. The bowed fingers 33 are formed in the free ends of these arms.

In the present example, the declutching fork 3 is of press-formed metal plate. The two arms 37 and 38 extend parallel to the plane of symmetry of the fork 3, this plane being the plane, i.e. the plane III—III on which the cross section of FIG. 3 is taken, which passes through the axis 6 and contains the pivot fulcrum point 7 (about which the declutching fork 3 is articulated), when the fork 3 is mounted on the casing 40. Each of the bowed fingers 33 of the arms 37 and 38 has a cross section, through a plane at right angles to the above mentioned plane of symmetry, i.e. looking downwards in FIGS. 3 and 4, which is generally U-shaped. The outer surface of each bowed finger is convex and cylindrical, having a generatrix at right angles to the plane of symmetry. These outer surfaces of the fingers are aligned with each other, and it is through these two surfaces that the declutching fork 3 cooperates with, here, the thrust ring 113 of the manoeuvring element 10 of the clutch release bearing 1.

These outer surfaces are profiled. More precisely, the generatrix common to the two outer surfaces by which the declutching fork 3 is in contact with the thrust zone 13 corresponds to a line of contact 8 which intersects the axis 6 regardless of the angular position of the declutching fork 3 about its pivot fulcrum point 7.

In FIG. 2, in which the declutching fork 3 is shown in two positions, it will be seen that in each of these two positions, the point indicated at 8 in FIG. 2 (which is the point of contact, on the line of contact 8, of each finger 33 of the fork 3 with the thrust surface 13) lies on the axis 6. In other words, the convex cylindrical outer surfaces of the bowed fingers 33 have a directrix which is obtained by the intersection of their extension with the plane of symmetry of the declutching fork 3. This direction is a portion of a curve such that, at the point of intersection of this curve with the axis 6 when it has been rotated in the plane of symmetry about the pivot point 7, the tangent to the curve lies in the plane at right angles to the axis 6 at this point.

A directrix according to this definition which has given excellent results is defined by the following coordinates in cartesian notation, in which the origin is the pivot point 7. The x-axis extends along the axis 6 of the guide member 2, while the y-axis extends at right angles to the x-axis and in the transverse plane defined by the pivot point 7 and the axis 6 of the guide member 2:

| x | 57.15 | 55.23 | 53.64 | 52.40 | 51.53 | 51.05 | 50.99 |
|---|-------|-------|-------|-------|-------|-------|-------|
| y | 0.88  | 1.61  | 2.07  | 2.31  | 2.40  | 2.41  | 2.40  |

A directrix such as this does of course enable all pivoting force on the abutment surface to be eliminated, and any directrix which is close to it leads to substantial minimization of such a force by comparison with the arrangements of the prior art.

What is claimed is:

1. A declutching device for a clutch, comprising a fixed structure including a tubular guide member defining an axis, the fixed structure further including pivotal mounting means defining at least one fixed pivot point spaced away from the axis, the declutching device comprising a clutch release bearing mounted on the guide member for axial sliding movement along the guide member, and a declutching fork mounted on the mounting means for pivoting movement about the pivot point, the clutch release bearing including a manoeuvring element having a thrust zone, the declutching fork having an end portion cooperating with the thrust zone for displacing the clutch release bearing axially along the guide member, wherein the end portion of the declutching fork is profiled so as to define a line of contact of the fork with the thrust zone, the line of contact intersecting the axis regardless of the angular position of the declutching fork about the pivot point.

2. A device according to claim 1, wherein the end portion of the declutching fork comprises two arms, each having a free end configured as a bowed finger.

3. A device according to claim 2, wherein the declutching fork defines a plane of symmetry, and said two arms extend parallel to the plane of symmetry.

4. A device according to claim 2, wherein the declutching fork defines a plane of symmetry, and each said finger has a generally U-shaped cross section through a plane at right angles to the plane of symmetry.

5. A device according to claim 2, wherein the declutching fork defines a plane of symmetry, and the bowed fingers have convex, cylindrical outer surfaces defining generatrices at right angles to the plane of symmetry.

6. A device according to claim 5, wherein the outer surfaces define a generatrix which is a portion of a curve having a tangent such that, at the point of intersection of this curve with the axis, when it is turned in the plane of symmetry about the pivot point, the tangent to the curve at that point is in the plane at right angles to the said axis.

7. A device according to claim 6, wherein the said directrix is defined by the following cartesian coordinates, where the origin is the said pivot point, the x-axis extends along the said axis of the guide member, and the y-axis extends at right angles to the x-axis in a transverse plane defined by the pivot point and the axis of the guide member:

| x | 57.15 | 55.23 | 53.64 | 52.40 | 51.53 | 51.05 | 50.99 |
|---|-------|-------|-------|-------|-------|-------|-------|
| y | 0.88  | 1.61  | 2.07  | 2.31  | 2.40  | 2.41  | 2.40. |

\* \* \* \* \*